(12) United States Patent
Centofante et al.

(10) Patent No.: US 8,336,610 B2
(45) Date of Patent: Dec. 25, 2012

(54) DEVICE AND METHOD FOR TEMPERATURE CONTROL IN AN AIRCRAFT CABIN (75) Inventors: Nico Centofante, Hamburg (DE); Markus Petrac, Deinste (DE); Thomas Scherer, Hamburg (DE); Uwe Buchholz, Bliedersdorf (DE)

(73) Assignee: Airbus Deutschland GmbH, Hamburg (DE)

( * ) Notice: Subject to any disclaimer, the term of this patent is extended or adjusted under 35 U.S.C. 154(b) by 1692 days.

(21) Appl. No.: 10/582,701

(22) PCT Filed: Dec. 30, 2004

(86) PCT No.: PCT/EP2004/014858
§ 371 (c)(1),
(2), (4) Date: Jun. 13, 2006

(87) PCT Pub. No.: WO2005/063577
PCT Pub. Date: Jul. 14, 2005

(65) Prior Publication Data
US 2007/0119585 A1    May 31, 2007

(30) Foreign Application Priority Data
Dec. 30, 2003  (DE) .................................. 103 61 646

(51) Int. Cl.
*B64D 13/04* (2006.01)
*B64D 13/08* (2006.01)
*B64D 13/00* (2006.01)
*B64D 11/00* (2006.01)
*G05D 15/00* (2006.01)
*G05D 16/00* (2006.01)
*G05D 23/00* (2006.01)

(52) U.S. Cl. .......... 165/235; 165/279; 165/282; 454/76; 237/2 A; 244/118.5

(58) Field of Classification Search .................. 165/202, 165/203, 235, 246, 247, 279, 281, 282; 454/74, 454/76; 244/118.5; 237/2 A
See application file for complete search history.

(56) References Cited

U.S. PATENT DOCUMENTS
2,388,855 A * 11/1945 Leslie ........................... 237/2 A
(Continued)

FOREIGN PATENT DOCUMENTS
EP           0555500 A1    8/1993
(Continued)

OTHER PUBLICATIONS
Forms PCT/ISA/210, 220, 237 International Search Report for PCT/EP2004/014858, mailed Apr. 14, 2005.

*Primary Examiner* — Ljiljana Ciric
(74) *Attorney, Agent, or Firm* — Wood, Herron & Evans, LLP (57) ABSTRACT

A device for temperature control in an aircraft cabin includes a first supply control arrangement and a first pressure control arrangement. The first supply control arrangement includes an air duct and a valve arrangement that controls a supply of heated air delivered to a first temperature area of the aircraft cabin such that a first specified temperature for the first temperature zone is achieved. When the valve arrangement fails, the first pressure control arrangement operates to control a pressure of heated air supplied into the first temperature area such that the first specified temperature for the first temperature zone is achieved.

15 Claims, 5 Drawing Sheets

U.S. PATENT DOCUMENTS

| | | | |
|---|---|---|---|
| 2,451,280 A * | 10/1948 | Del Mar | 165/235 |
| 2,851,254 A | 9/1958 | Messinger et al. | |
| 2,909,323 A * | 10/1959 | Cholvin et al. | 236/80 R |
| 2,959,028 A | 11/1960 | Beggs | |
| 3,711,044 A * | 1/1973 | Matulich | 244/118.5 |
| 4,060,997 A * | 12/1977 | Shultz et al. | 62/180 |
| 4,462,541 A * | 7/1984 | Hansen | 237/2 A |
| 4,735,056 A | 4/1988 | Goodman | |
| 4,742,761 A * | 5/1988 | Horstman | 454/74 |
| 5,479,983 A | 1/1996 | Fischer et al. | |
| 5,642,729 A * | 7/1997 | Cassidy | 128/204.29 |
| 6,189,324 B1 | 2/2001 | Williams et al. | |
| 6,389,826 B2 * | 5/2002 | Buchholz et al. | 454/76 |
| 6,415,621 B2 * | 7/2002 | Buchholz et al. | 62/173 |
| 6,491,254 B1 * | 12/2002 | Walkinshaw et al. | 244/118.5 |
| 7,775,447 B2 * | 8/2010 | Scherer et al. | 165/203 |
| 7,967,249 B2 * | 6/2011 | Muhlthaler et al. | 244/118.5 |
| 8,118,257 B2 * | 2/2012 | Wilmot et al. | 244/118.5 |

FOREIGN PATENT DOCUMENTS

| | | |
|---|---|---|
| FR | 2485473 | 12/1981 |
| GB | 1140181 | 1/1969 |
| GB | 1284959 | 8/1972 |
| GB | 1385182 | 2/1975 |
| GB | 1604541 | 12/1981 |
| JP | 2602654 B2 | 2/1988 |

\* cited by examiner

DEVICE AND METHOD FOR TEMPERATURE CONTROL IN AN AIRCRAFT CABIN

TECHNICAL FIELD

The present invention relates in general to temperature control in an aircraft cabin.

BACKGROUND

Systems which extract hot exhaust air from turbines of an aircraft driving apparatus are generally employed for the control of temperatures in aircraft cabins. This hot air, referred to as driving apparatus tap air, is cooled down to a temperature desired in the aircraft cabin. In the case of aircrafts, whose cabins are divided into different temperature areas or climate zones, a portion of the hot air is cooled down to the lowest temperature of one or more temperature areas. In order to achieve higher temperatures in other temperature areas, a portion of the hot air is branched off before the cooling to the lowest temperature, is cooled to a lesser degree, thus brought to a temperature above the lowest temperature, and mixed with the air that has been cooled to the lowest temperature such that in these temperature areas the desired temperatures are achieved. With such a system, which is also known as the "Trim-Air System", individually adjustable temperatures can be provided in the different temperature areas of an aircraft cabin.

Figure 1:
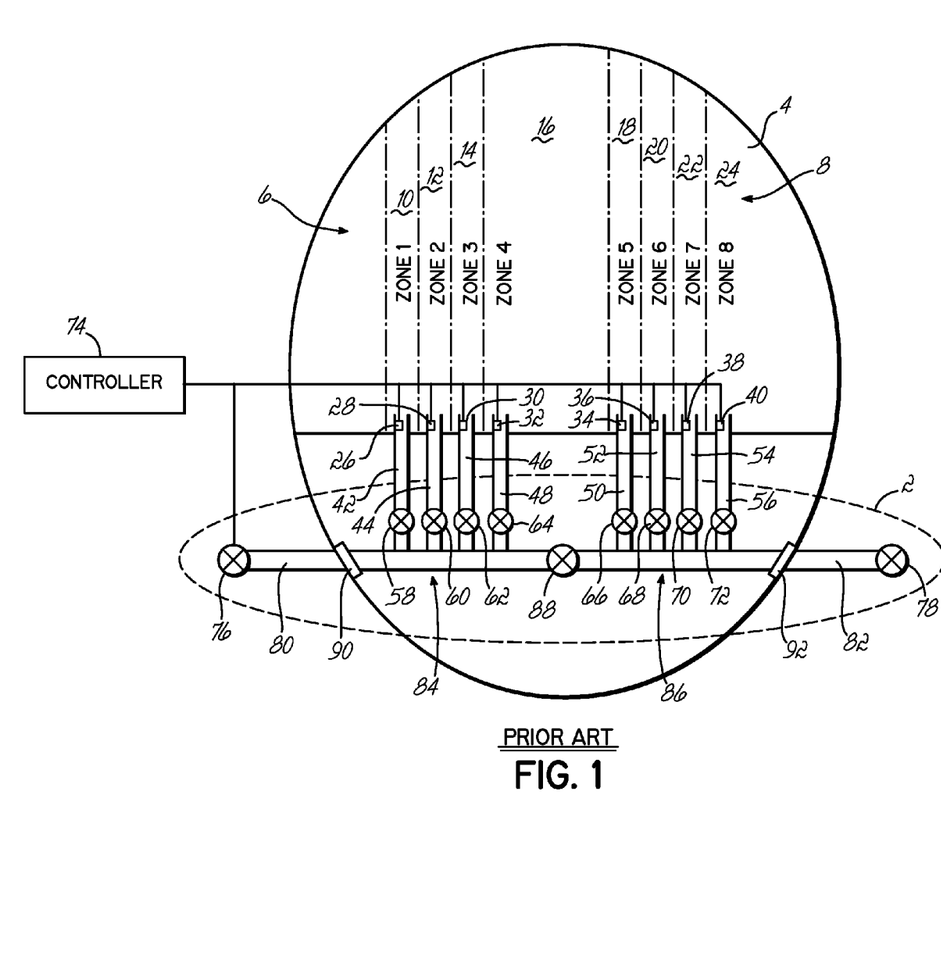
FIG. 1 is a schematic illustration of a known system for temperature control in an aircraft cabin.

FIG. 1 illustrates in simplified form such a known system 2 for temperature control in an aircraft cabin 4. System-specific terms of components outlined below are respectively specified in brackets.

Figure 4:
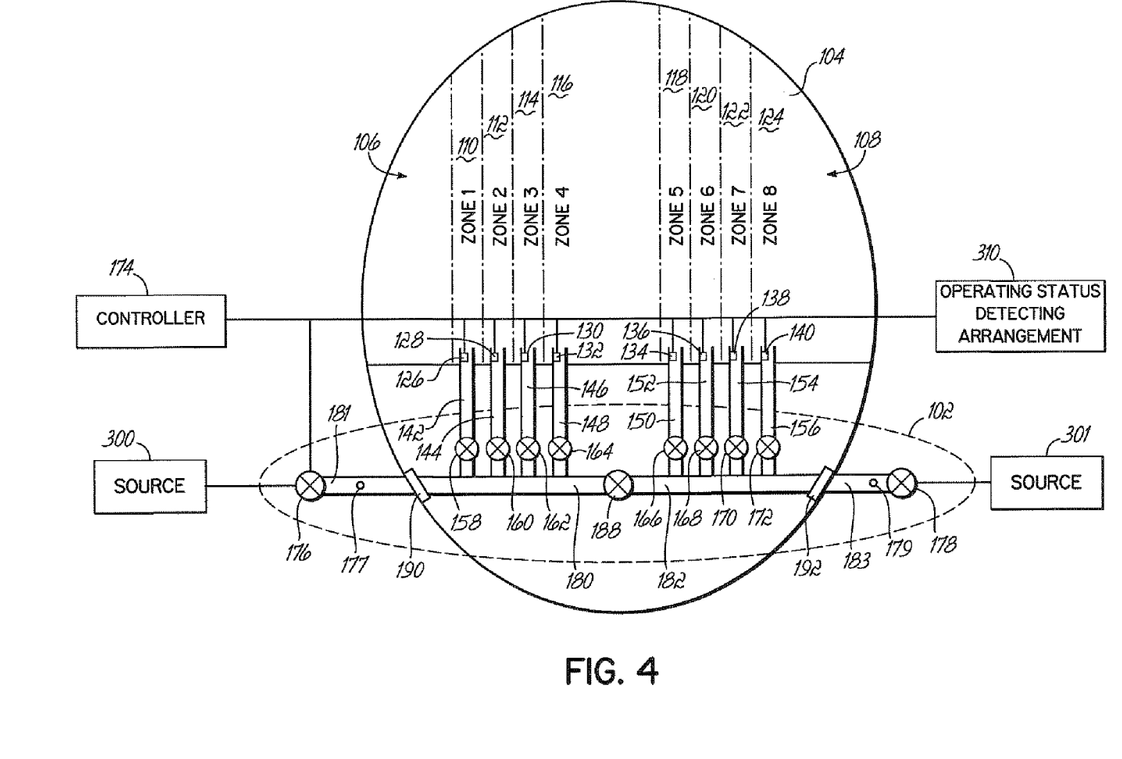
FIG. 4 shows a device according to the invention provided for two temperature areas comprising two pressure control arrangements for temperature control in an aircraft cabin (two-quadrant system)

The aircraft cabin 4 is divided into two temperature areas 6 and 8 which comprise for example the right and left side, respectively, of the aircraft cabin 4. Each temperature area 6, 8 is in turn divided into individual temperature zones. In FIG. 4 four temperature zones 10 to 16 for the temperature area 6 and for the temperature area 8 four temperature zones 18 to 24 are exemplarily illustrated.

In order to indicate current temperatures prevailing in the temperature zones 10 to 24, temperature sensors 26 to 40 (duct sensors) are used. The temperature sensors 26 to 40 are disposed in end areas (not shown) of air outlet ducts 42 to 56 (ducts), which serve for a supply of air into the temperature areas 6 and 8. Moreover, further temperature sensors (not shown) are disposed in the aircraft cabin 4 itself in order to provide additional information about temperatures in the temperature zones 10 to 24.

In each of the air outlet ducts 42 to 56 is disposed a valve 58 to 72 (trim-air valve). The valves 58 to 72 are controlled depending upon a currently prevailing temperature in a corresponding temperature zone 10 to 24. Signals from the temperature sensors 26 to 40 are processed by a control device 74 (trim-air-system controller) in order to control the valves 58 to 72 such that in the temperature areas 6 to 8 and in the temperature zones 10 to 24, respectively, desired temperatures are achieved and maintained, respectively.

The system 2 obtains heated air via two valves 76 and 78 (trim-air pressure regulating valve). Heated air supplied via the valve 76 is based on hot air from the driving apparatus on one side of the aircraft, while air supply via the valve 78 originates from the driving apparatus on the other side of the aircraft.

The valves 76 and 78 are pneumatically controlled valves, which are pre-adjusted such that relative to the internal pressure in the aircraft cabin 4 and to the internal pressures prevailing in the temperature areas 6 and 8 in the air ducts 80 and 82 (trim-air supply duct) a substantially constant pressure is maintained. The adjustment of the valves 76 and 78 is mechanically realized beforehand and cannot be varied during the flight.

In addition to the positions of the valves 76 and 78, which positions are, variable in normal operation by means of pneumatic control, the valves 76 and 78 can be fully opened if extreme heating power is required to heat the aircraft cabin 4. This is the case, for example, if the aircraft is to be heated rapidly before take off.

Heated air supplied via the valves 76 and 78 is guided via the air ducts 80 and 82 via areas 84 and 86 to the valves 58 to 72. The areas 84 and 86 are comparable to manifold areas, which is why the areas 84 and 86 are also referred to as trim-air manifolds. Downstream from the valves 58 to 72 and upstream from the temperature sensors 26 to 40, heated air supplied via the valves 76 and 78 is mixed with air having a temperature that corresponds with the lowest desired temperature for the temperature zones 10 to 24. The components required for this are not shown in FIG. 1.

The air ducts 80 and 82 can be connected together via a valve 88 (trim-air shut-off valve), which is closed in normal operation. If for example the valve 76 or its air supply fails, valve 88 is opened in order to control, in addition to the temperature area 8, the temperature of the temperature area 6 by way of heated air obtained via valve 78.

Check valves 90 and 92 (trim-air check valve) are disposed in the air ducts 80 and 82 upstream from the areas 84 and 86 and downstream from the valves 76 and 78, respectively. The valves 90 and 92 serve as blocking means in order to prevent reflux of air from the valves 76 and 78. Should valve 88 be opened in the event of a malfunction, for example, of the valve 76, the valve 90 prevents heated air supplied via valve 78 from reaching valve 76 and is consequently available for temperature control in the aircraft cabin 4.

In view of the design of the system 2 for temperature control in two temperature areas 6,8 shown in FIG. 1, such a design is also referred to as a two-quadrant system. Should one of the valves 58 to 72 malfunction or fail completely it may no longer be possible to accomplish the temperature control in the corresponding temperature zones and potentially in the corresponding temperature area such that the temperatures desired there can be reached and maintained, respectively.

If, for example, valve 58 fails in a substantially fully opened state, it is possible that at least the temperature zone 10 becomes too warm. In case of a failure of the valve 58 in a substantially closed state, an undesirably intense temperature drop in the temperature zone 10 may occur.

In FIG. 1, the components of the trim-air system 2 used for the temperature area 6 represent the first quadrant, while the components serving the temperature area 8 represent the second quadrant.

To avoid this, in the event of a failure of one of the valves 58 to 72, the heated air supply-serving valve 76, 78 of the corresponding quadrant is fully closed. Should for example the valve 58 (partly/fully) fail, the valve 76 is closed. Correspondingly, the valves 60 to 64 and thus also the temperature zones 12 to 16 are no longer supplied with heated air. A control of temperature in the temperature area 6 is then no longer possible.

A supply of the malfunction-free valves 60 to 64 with heated air from the valve 78 by opening the valve 88 is not achievable, because the malfunctioning valve 58 is then also supplied with heated air. It is precisely this, however, that should be avoided.

To avoid a too intense temperature drop or increase in the temperature area 6, the minimum temperature of the air mixed in downstream from the valves 58 to 72 (i.e. the lowest temperature zone temperature) can be increased or lowered. In this case a compromise between temperatures in the temperature areas 6 and 8 must be arrived at to avoid on the one hand passengers in the temperature area 8 from being subjected to too high temperatures and on the other hand passengers in the temperature area 6 from being subjected to too low temperatures.

The object of the present invention is to provide solutions, which provide an improved temperature control in a room, and particularly to solve the problems of the state of the art named above.

SUMMARY

This object is achieved by the present invention by way of the device and the method that are defined in the following description and claims.

The device according to the invention for temperature control in an aircraft cabin comprises a first supply control arrangement for control of the supply of heated air from a first source into a first temperature area of the aircraft cabin depending on a first temperature specified for the first temperature area and a first pressure control arrangement for the control of a current pressure in the first supply control arrangement in the event of a malfunction of the first supply control arrangement depending on the specified first temperature.

In normal operation of the device according to the invention, the temperature control is carried out by controlling the supply of heated air from the first source such that in the first temperature area the specified first temperature is achieved and maintained, respectively. In the case of a malfunction of the first supply control arrangement, the temperature-dependent supply control of heated air from the first source is replaced by the control of the pressure in the first supply control arrangement by means of the first pressure control arrangement. In this case, the air pressure control is such that also in the first temperature area the specified first temperature is achieved and maintained, respectively.

Malfunction of the first supply control arrangement is to be understood as any operating status, in which, by means of the supply control, the temperature control in the first temperature area cannot be realized in the desired manner. This can occur not only if the supply control itself fails but also if the supply control is not suitable to achieve or maintain the specified first temperature. The latter may be the case, for example, if in the first temperature area the current actually prevailing supply-controlled temperature deviates by a maximum admissible value from the specified first temperature.

The first supply control arrangement is preferably further provided for the control of the supply of heated air from the first source into a second temperature area of the aircraft cabin, wherein this control is realized depending upon a specified second temperature for the second temperature area. In this manner, at least in normal operation, a separate temperature control can take place for different temperature areas of the aircraft cabin based on air used for both temperature areas, namely heated air from the first source. Since the supply-controlled temperature adjustment of the first and second temperature areas can be realized in general independently of one another, the first and second temperatures can differ although heated air from the first source is used for both temperature areas.

In the case of a malfunction of the first supply control arrangement, is indented to achieve, depending on the specified second temperature, by means of the first pressure control arrangement the temperature control by control of a current pressure in the first supply control arrangement depending on the specified second temperature. This pressure-controlled temperature control in the aircraft cabin is particularly beneficial in the event that the first supply control arrangement comprises different components for a supply of heated air from the first source into the first temperature area and the second temperature area. Should the malfunction of the first supply control arrangement relate to the second temperature area, the second temperature area can be temperature-controlled comparably with respect to normal operation depending on the specified second temperature by means of the pressure control. As described in greater detail below, there is no requirement that the supply-controlled temperature control of the first temperature area be replaced by a pressure control.

The device according to the invention can also comprise a second supply control arrangement for the control of a supply of heated air from a second source into a third temperature area of the aircraft cabin depending on a third temperature specified for the third temperature area and a second pressure control arrangement in order to control, depending on the specified third temperature, a current pressure in the second supply control arrangement in the event of a malfunction of the second supply control arrangement.

The above descriptions with respect to the supply-controlled temperature control in normal operation and the pressure-controlled temperature control in the event of a failure apply here accordingly.

The use of the second supply control arrangement and the second pressure control arrangement enables the design of a two-quadrant system with respect to the aircraft cabin, wherein the aircraft cabin is supplied at least in normal operation via two supply control arrangements and/or two pressure control means.

Preferably, the second supply control arrangement serves for the control of a supply of heated air from the second source into a fourth temperature area of the aircraft cabin depending on a specified fourth temperature for the fourth temperature area, wherein, in the event of a malfunction of the second supply control arrangement, the second pressure control means arrangement serves to control a current pressure in the second supply control arrangement depending on the specified fourth temperature. The above descriptions also apply accordingly in this case.

The embodiment of the device according to the invention for temperature control in four temperature areas of the aircraft cabin permits a design of a four-quadrant-system in order to control, at least in normal operation, four different areas of the aircraft cabin separately with respect to desired temperatures.

In the case of a malfunction of one of the supply control arrangements for one of the four temperature areas, the affected temperature area can be maintained at the corresponding temperature by pressure control. The not-affected temperature areas can continue to be temperature-controlled via a supply control of heated air as described in more detail below.

It is furthermore intended that the device according to the invention can comprise further supply control arrangements comprising the features and functions cited above and further pressure control arrangements associated to said further supply control arrangements also comprising the features and functions cited above in order to supply more than four room temperature areas.

Irrespective of the number of supply control arrangements and pressure control arrangements and/or the number of temperature areas, it can be prevented by means of the device according to the invention that, in the event of an error affecting a temperature area, the temperature control of this area must be terminated. Rather, even the temperatures of the affected temperature area(s) in the event of a malfunction can continue to be controlled, namely by pressure control.

In the case of the following further preferred embodiments, reference is generally made to one supply control arrangement, one temperature area, one pressure control arrangement etc. Depending on the number of provided supply control arrangements, temperature areas, pressure control arrangements etc., the following descriptions apply to the first supply control arrangement and/or the second supply control arrangement, the first temperature area and/or the second temperature area and/or the third temperature area and/or the fourth temperature area, the first pressure control arrangement and/or the second pressure control arrangement etc.

The supply control arrangement preferably comprises an air intake, which is coupled with the pressure control arrangement provided for the supply control arrangement, an air outlet, which is coupled with the temperature area(s) serviced by the supply control arrangement, and an air duct, in order to supply the respective air between the air intake and the air outlet.

When at least one of the temperature areas is divided into temperature zones, for which a separate temperature control shall be possible, the air outlet of the supply control arrangement that is appropriate for this temperature area comprise air outlet ducts in order to supply the different temperature zones with heated air.

Preferably, the control of the supply of air to a temperature area is accomplished by means of a valve arrangement included in the supply control arrangement provided for this temperature area. In this case the valve arrangement can be disposed at the corresponding air outlet in order to supply temperature-dependently controlled heated air to the corresponding temperature area.

In the event that air outlet ducts are used for the supply of different temperature zones, the valve arrangement for each air outlet duct can incorporate a valve. In order to a detect a malfunction of a supply control arrangement, the device according to the invention may comprise at least one operating status detecting arrangement associated to a supply control arrangement. Information about the operating status of the supply control arrangement(s) can also be provided by devices or arrangements separate with respect to the device according to the invention, which separate devices or arrangements are connected in accordance with the respective supply control arrangement and/or the device according to the invention.

Preferably, the at least one operating status detecting arrangement serves for the purpose of detecting of a current operating status of the corresponding valve arrangement and/or, where present, corresponding valves.

The device according to the invention can comprise at least one pressure detecting arrangement associated to a pressure control arrangement in order to detect the current air pressure in the corresponding supply control arrangement. The use of a pressure detecting arrangement permits the use of a pressure controlled valve as pressure control arrangement associated thereto, which pressure controlled valve, for example, in normal operation can be differently controlled from preliminary settings. A pressure detecting arrangement further supplies the corresponding pressure control arrangement in the event of a malfunction of the allocated supply control arrangement with information about currently prevailing pressures in this supply control arrangement without the use of separate pressure detecting systems.

In the case of the use of the first supply control arrangement and the second supply control arrangement, is contemplated to use a connecting arrangement in order to enable a selective connection of the supply control arrangements.

When the device according to the invention is provided, for example, for the supply of the first temperature area and of the second temperature area, it is possible to establish a connection between the first supply control arrangement and the second supply control arrangement by means of the connecting arrangement. Should one of the pressure control arrangements malfunction in normal operation, the other pressure control arrangement supplies both supply control arrangements. Using of the device according to the invention for more than two temperature areas permits that the connecting arrangement ensures the continued temperature controlled heating and/or cooling of the temperature areas not affected by the malfunction, by connecting the first supply control arrangement and the second supply control arrangement with each other such that the unaffected temperature areas are serviced by a pressure control arrangement. The temperature area affected by the malfunction can then be pressure-controlled maintained at the respective temperature by the other pressure control arrangement.

The device according to the invention preferably comprises at least one shut-off arrangement associated to a supply control arrangement in order to prevent airflow upstream in the direction from the respective temperature area to the corresponding pressure control arrangement. This embodiment is particularly beneficial in the event that the connecting arrangement is provided in order to prevent airflow from the pressure control arrangement, which serves for a supply of unaffected temperature areas, to the other pressure control arrangement and particularly pressure changes resulting from this event, which pressure changes hinder or prevent a pressure-controlled temperature control in the affected temperature area. In normal operation, the at least one shut-off arrangement can prevent damages to the corresponding pressure control arrangement, for example, in the case of a pressure drop in the aircraft cabin.

The above explanations with respect to the device according to the invention apply correspondingly to the method according to the invention for controlling temperature in an aircraft cabin.

BRIEF DESCRIPTION OF THE DRAWINGS

The following refers to preferred embodiments with reference to the figures included.

DETAILED DESCRIPTION

FIG. 1 illustrates an embodiment of a system 102 for temperature control in an aircraft cabin 104, particularly in a temperature area 106 of the aircraft cabin 104.

The temperature area 106 is divided into individual adjacently disposed temperature zones 110 to 124. Temperature sensors 126 to 140 serve to detect the current prevailing temperatures in the temperature zones 110 to 124. The temperature sensors 126 to 140 are disposed in outlet areas of air outlet ducts 142 to 156 via which the heated air is supplied to the temperature zones 110 to 124.

In order to control the supply of heated air in the temperature zones 110 to 124, valves 158 to 172 are respectively disposed in the air outlet ducts 142 to 156. Based on signals/data of the temperature sensors 126 to 140, a controller 174 controls the valves 158 to 172 such that a specified temperature for the temperature area 106 is achieved.

Heated air originating from one or a plurality of turbines of the aircraft drive (i.e., a first source 300 of heated air) is supplied via a pressure-controlled valve 176. The valve 176 is pressure-controlled and serves as a pressure control arrangement for air pressure in an air duct 180, which is connected with the valve 176 by an air intake 181 and comprises an area 184, which is connected with the air outlets 142 to 156, in order to supply heated air supplied via valve 176 via the valves 158 to 172 to the temperature zones 110 to 124.

Downstream from the valve 176, a pressure sensor 177 is disposed in the air duct 180 for detecting the current prevailing pressure in the said air duct. Downstream from the pressure sensor 177 is disposed a shut-off arrangement 190 embodied as a check valve. The check valve 190 permits airflow in the direction from the valve 176 to the valves 158 to 172; the check valve 190 prevents airflow in the opposite direction.

The controller 174, which receives information from the pressure sensor 177 about the current prevailing air pressure, also controls the valve 176.

In normal operation the valve 176 is actuated by the controller 174 depending on pressures present in the air duct 180 such that in the air duct 180 a constant pressure relative to a current prevailing pressure in the aircraft cabin 104 is maintained. As opposed to the prior art system described at the outset, in normal operation the pressure controlled valve 176 is permitted to vary such that the desired pressure in the air duct 180 is controlled relative to the internal pressure in the aircraft cabin 104.

In normal operation, the temperature of the temperature area 106 is controlled by detecting, by means of the temperature sensors 126 to 140, information about the prevailing temperatures in the temperature zones 110 to 124 and by closing or opening the valves 158 to 172 (to a sufficient degree) by the controller 174 to an extent to achieve the desired temperature for the temperature area 106. In addition to the illustrated temperature sensors 126 to 140, further temperature sensors can be used in temperature area 106, for example, associated to the temperature zones 110 to 124 (not shown) in order to obtain additional information about current prevailing temperatures in the temperature area 106 and/or the temperature zones 110 to 124.

In the event of a malfunction of one or a plurality of the valves 158 to 172, it can be possible that, at least for the affected temperature zone(s), it is no longer possible to achieve and/or maintain the desired temperature via a valve-controlled air supply regulation. It is intended that the pressure-controlled temperature control of the temperature area 106 described below is not brought about in the case of every valve error. Should one of the valves 158 to 172 malfunction but an acceptable supply-controlled temperature control of the temperature area 106 is nevertheless possible within specified limits, the system 102 can be operated as in normal operation (i.e. no valve malfunction) if also with a certain loss of comfort in temperature area 106. In the case of a valve error, which permits no supply-controlled temperature control in temperature area 106, the system 102 is operated such that the supply control of the temperature in temperature area 106 is replaced by a pressure control.

Should, for example, valve 158 fail in a fully or nearly fully open state and remain blocked in this state, the associated temperature zone 110 will be subjected to too high heating power due to a too high supply of heated air. A supply-controlled temperature control in the temperature zone 110 is then no longer possible. In the event that the malfunction of the valve 158 is detected by an operating status detecting arrangement 310, the supply-controlled temperature control of the temperature area 106 is deactivated and replaced by a pressure-control temperature control.

In order to prevent too high temperatures arising in the temperature zone 110 due to the (too widely) opened valve 158, the valve 176 is controlled such that the prevailing pressure in the air duct 180 is lowered to a value that reduces the air quantity supplied via valve 158 to the temperature zone 110 such that the desired temperature is achieved there. In this case, by means of the temperature sensors 126, it is checked as to whether the desired temperature for the temperature zone 110 is being achieved. Unless it is affected by the malfunction, the valve 176 is controlled such that a further pressure drop in the air duct 180 and thus a further reduction of the air supplied via the valve 158 is brought about. Once the desired temperature for the temperature zone 110 is achieved, the pressure in the air duct 180 is maintained and/or controlled by means of a corresponding controller of the valve 176 such that is the desired temperature for the temperature zone 110 can be maintained.

In order to maintain the corresponding temperatures in the unaffected temperature zones 112 to 124, the non-malfunctioning valves 160 to 172 are controlled such that the amount of heated air reaching temperature zones 112 to 124 via these valves is sufficient to achieve and/or to maintain the corresponding temperature zone temperatures. In the case of the malfunction assumed here, the pressure in the air duct 108 is lowered. Correspondingly, the valves 160 to 172 are opened further in order to compensate for the lowered supply pressure and to supply the temperature zones 112 to 124 with corresponding heating power.

Should, for example, the valve 158 fail in a nearly closed state, the heating power provided by the quantity of air flowing through this valve is no longer sufficient to maintain the desired temperature for the temperature zone 110. In this case, the supply-controlled temperature control of the temperature area 106 is terminated and is replaced by a pressure-controlled temperature control. In this case, the valve 176 is operated such that a pressure increase in the air duct 180 is brought about such that, despite the state of the valve 158, sufficient air passes through it in order to control the temperature in the zone 110 in the desired manner. In order to prevent too high temperatures in the temperature zones 112 to 124 supplied by non-malfunctioning valves 160 to 172, these valves are closed far enough to compensate for the increased supply pressure so that the desired temperatures can be achieved in these zones.

Should it be determined in the event of such a malfunction on the basis of information detected by the temperature sensor 126 that a pressure increase in the air duct 180 does not lead to the desired temperature increase for the temperature zone 110, is it is intended to cease further pressure increase via the valve 176. This thereby avoids pressures in the air duct 180 that do not provide in the desired manner for a temperature control in the temperature zone 110 and which could lead to damages.

Should the valve 158 fail in a fully closed state, the supply-controlled temperature control of the temperature area 106 can be maintained or removed by pressure-controlled temperature control. Since in the event of such a malfunction there can be no further air supply through the valve 158 in the temperature area 106, a separate temperature control for the temperature area 110 is not possible. In order to achieve and/or maintain the respectively desired temperatures in the unaffected temperature zones 112 to 124, the valves 160 to 172 can be controlled as in normal operation. Due to the closed valve 158 a pressure increase is brought about in the air duct 180. Correspondingly, too high temperatures in the unaffected temperature zones 112 to 124 are avoided by controlling the valves 160 to 172 such that less heated air passes through these valves. Alternatively, it is intended to also replace the supply control by a pressure control, wherein in this case the valve 176 is controlled for the purpose of compensating for the pressure increase caused due to the failure of the valve 158.

Figure 2:
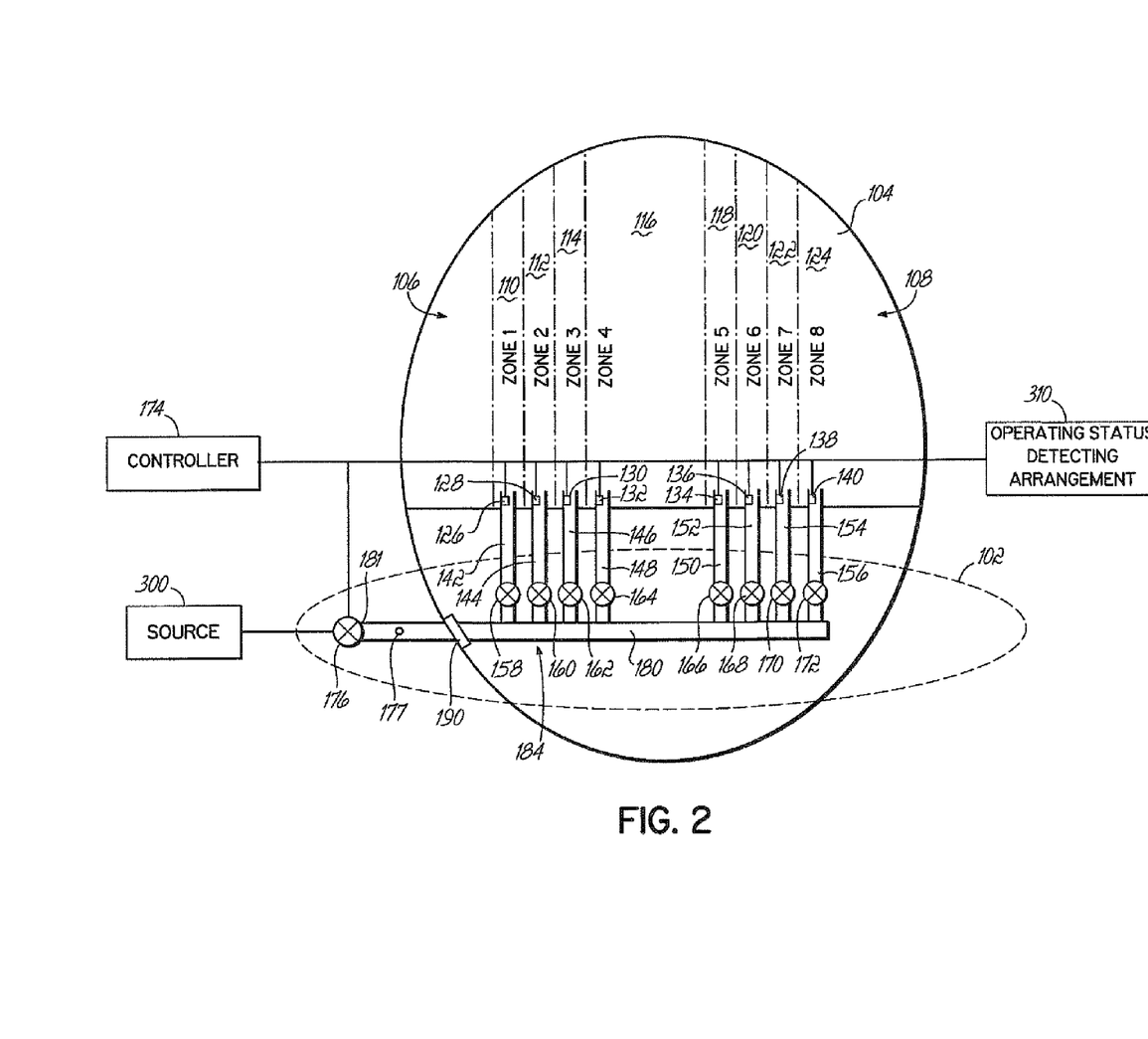
FIG. 2 shows a device according to the invention provided for one temperature area for temperature control in an aircraft cabin (single-quadrant system)
Figure 3:
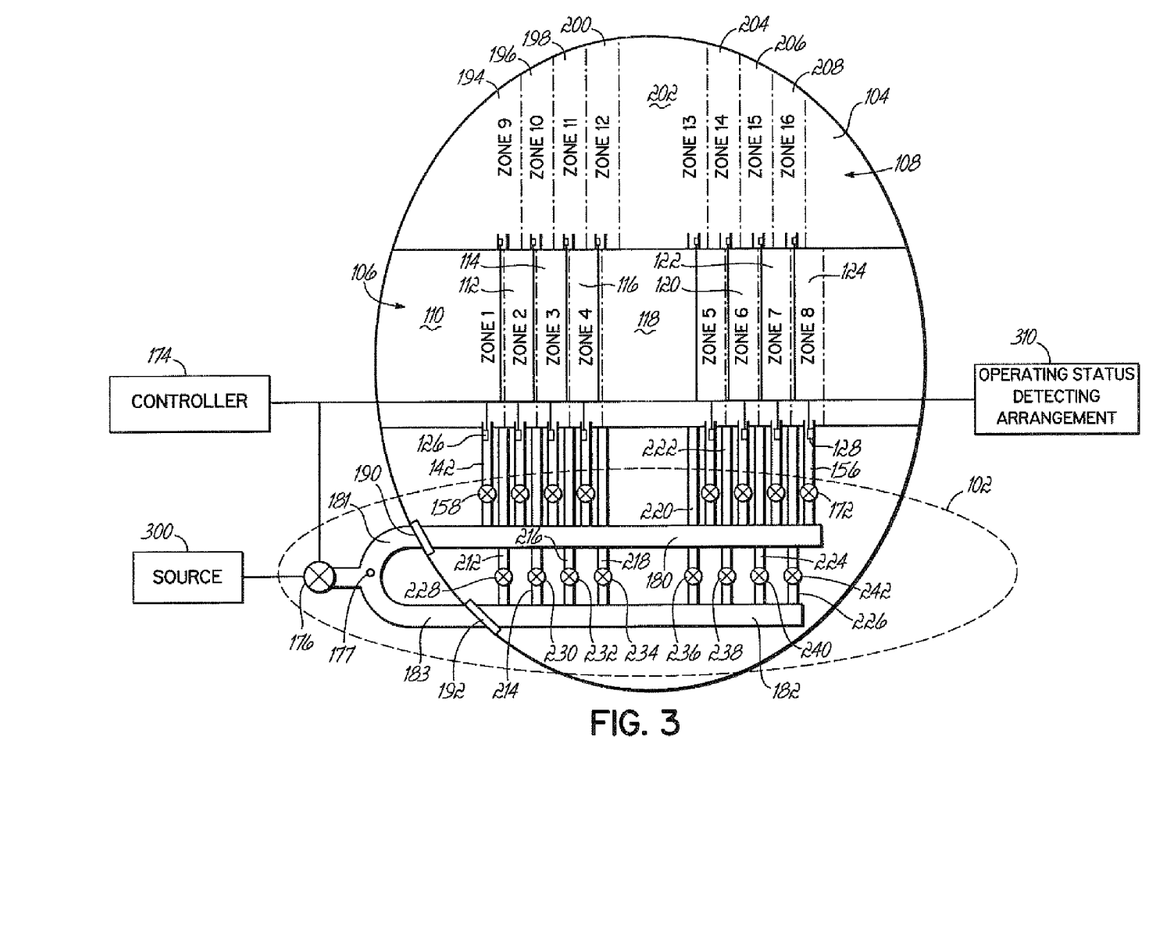
FIG. 3 shows a device according to the invention provided for two temperature areas comprising a pressure control arrangement for temperature control in an aircraft cabin.

The embodiment shown in FIG. 3 differs from the embodiment shown in FIG. 2 in that the aircraft cabin comprise 104, along with the temperature area 10, a temperature area 108, which is divided into temperature zones 194 to 208. For the purpose of supplying the temperature zones 194 to 208, air outlet ducts 212 to 226 are provided, wherein are respectively disposed valves 228 to 242. In the air escape ducts 212 to 226 are respectively disposed, not shown here sensors, which are comparable with the sensors 158 to 172. The air outlet ducts 212 to 226 are connected to an air duct 182. The air duct 182 comprises a check valve 192 and an air intake 183 via which the air from the valve 176 is supplied. To detect the pressure in the air duct 182, a pressure sensor 177 is disposed downstream from the valve 176. The above explanations taking into account FIG. 2 correspondingly apply here for all features and functions of the embodiment in accordance with FIG. 3. This applies particularly for the normal operation, wherein temperature control of the temperature areas 106 and 108 is supply-controlled, and in the event of malfunction, wherein the temperature control for temperature area affected by the malfunction is pressure controlled.

Technical Field

In the case of the embodiment illustrated in FIG. 4, the system 102 serves for temperature control in an aircraft cabin 104 with two temperature areas 106 and 108. This system 102 can be described as a two-quadrant system since the temperature areas 106 and 108 can be operated as areas with separate temperature control. The temperature area 106 comprises temperature zones 110 to 116, which are supplied with heated air via air outlet ducts 126 to 132, valves 142 to 148, an air duct 180, a check valve 109, an air outlet 181 and a valve 176 serving as a pressure control arrangement, the valve 176 communicating with the first source 300 of heated air. The temperature area 108 comprises temperature zones 118 to 124, which are supplied via air outlet ducts 134 to 140 and valves 150 to 156 and an air duct 182 and a check valve 192 and an air outlet 183 and further valve 178, which serves as a further pressure control arrangement and is communicating with a second source 301 of hot air. For the purpose of pressure detecting, in the air duct 180 and 182 pressure sensors 177 and 179 are provided, which are associated to the pressure control arrangement 176 and/or 178. Information about temperatures in the temperature areas 106 and 108 is obtained by means of temperature sensors 126 to 132 and/or 134 to 140.

The air ducts 180 and 182 are connectable via a valve 188. In normal operation, the valve 188 is closed. Therefore, the components of the system 102 that are used for the temperature area 106 are operated independently of the components of the system 102 that are responsible for the temperature area 108. Also in the event that one of the valves 158 to 164 and/or 166 to 172 malfunctions, the valve 188 remains closed; thus also in the event of a valve malfunction, the system 102 can be operated respectively separately for the temperature area 106 and the temperature area 108. The above explanations with reference to FIG. 2 therefore also apply accordingly for the normal and malfunction cases described there both for the components of the system 102 for the temperature area 106 and for the components of the system 102 for the temperature area 108.

In the case of a malfunction of the valve 176 or 178, the corresponding temperature area 106 and/or 108 can no longer be supplied. In such a case, the valve 188 is opened in order to conned the air ducts 180 and 182 to one another. Should, for example, the valve 176 fail and if the valve 188 is open, both the temperature area 106 and the temperature area 108 are supplied via valve 178. The check valve 190 prevents air supplied via valve 178 from reaching damaging or causing a loss of pressure at the valve 176. By the closure of the air duct 180 by means of the check valve 190 is brought about an arrangement, which is comparable with the embodiment from FIG. 2, namely a system with a pressure generating arrangement 178 for temperature control in the whole aircraft cabin 104. Correspondingly also in those cases wherein the valve 188 is open and the temperature areas 106 and 108 are supplied via one of the valves 176,178, in the event of malfunctioning supply-controlled temperature control this is replaced as described above with a pressure-controlled temperature control.

Figure 5:
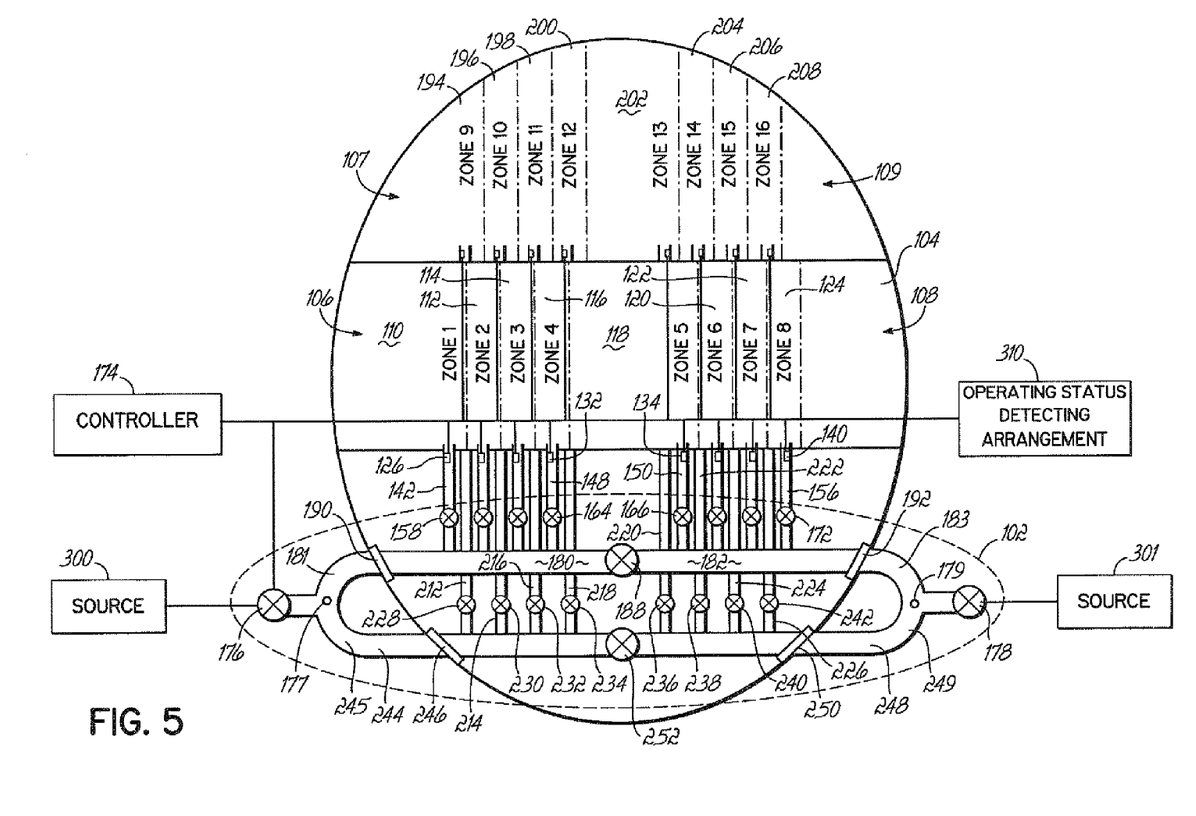
FIG. 5 shows a device according to the invention provided for four temperature areas for temperature control in an aircraft cabin (four-quadrant system).

The embodiment illustrated in FIG. 5 of a system 102 serves to supply four temperature areas 106,108,107 and 109. The system 102 from FIG. 5 can be described as a four-quadrant system since the temperature areas 106 to 109 can be operated as areas with separate temperature control.

The temperature area 106 comprises temperature zones 110 to 116, which are supplied with heated air via air outlet ducts 126 to 132, valves 142 to 148, an air duct 180, a check valve 109, an air outlet 181 and a valve 176, which serves as a pressure control arrangement. The temperature area 108 comprises temperature zones 118 to 124, which are supplied with heated air via air outlet ducts 134 to 140, valves 150 to 156, an air duct 182, a check valve 192, an air outlet 183 and a valve 178, which serves as a pressure control arrangement.

The temperature area 107 comprises temperature zones 194 to 200, which are supplied with heated air via air outlet ducts 212 to 218, valves 228 to 234, an air duct 244, a check valve 246, an air outlet 245 and also via the valve 176. The temperature area 109 comprises temperature zones 202 to 208 that are supplied with heated air via air outlet ducts 220 to 226, valves 236 to 242, an air duct 248, a check valve 250, an air outlet 249 and also via the valve 178.

For the detecting of pressure, pressure sensors 177 and 179 are provided in the air ducts 180, 244 and 182, 248, which pressure sensors 177 and 179 are the pressure control arrangement 176 and/or 178. Information about temperatures in the temperature areas 106 and 108 is obtained by means of temperature sensors 126 to 132 and/or 134 to 140; accordingly temperature sensors provided for the temperature areas 107 and 109 are not shown.

The air ducts 108 and 182 are connectable via a valve 188. In normal operation the valve 188 is closed. The air ducts 244 and 248 are also connected via a valve 252, which is also closed in normal operation. In normal operation, the in temperature areas 106 to 109 are supply-controlled temperature-controlled by means of the corresponding components of the system 102. In the case of a malfunction of the valve 176 or 178, the corresponding temperature areas 106,107 and/or 108,109 can no longer be supplied. In such a case, the valves 188 and 252 are opened in order to connect the air ducts 180 and 182 and the air ducts 244 and 248 to one another. Should, for example, the valve 176 fail and should the valves 188 and 252 be open, the supply of all temperature areas 106 to 109 is brought about via valve 178. The check valves 190 and 246 prevent air supplied via the valve 178 from reaching the valve 176. By the closure of the air ducts 180 and 244 by means of the check valve 190 and/or 246 is brought about an arrangement, which is comparable with the embodiment from FIG. 3, namely a system having a pressure generating arrangement 178 for controlling temperature in the whole aircraft cabin 104. Should a malfunction of the supply-controlled temperature control arise during such an operation, this is replaced by a pressure-controlling temperature control provided by a valve used for the supply of the temperature areas 106 to 109.

Should a malfunction of the supply-controlled temperature control of the temperature areas 106 to 109 arise in normal operation (valves 188 and 252 are closed, the supply-controlled temperature control is replaced for the temperature area affected by the malfunction by a pressure-controlled temperature control.

Should, for example, the valve 158 malfunction, the temperature control of temperature area 106, as described above in detail with reference to FIG. 1, is realized by pressure-control. Should the valves 188 and 252 remain closed, as described with reference to FIG. 3, the temperature area 107 is also supplied with heated air by means of pressure control.

In order to continue supply-controlled supply of the temperature area 107 not immediately affected by the malfunction of the valve 158, valve 252 is opened. This permits the temperature area 107 to be supplied with heated air via the valve 178. In the case of this procedure, it is to be taken into account that the prevailing pressure in the air ducts 182, 244 and 248 is to be higher than the pressure in the air duct 180 in order to keep the valve 246 closed. The closed valve 246 separates those areas of the system 102 that are operated for a pressure-controlled temperature control from those areas that serve for a supply-controlled temperature control.

Should a pressure reduction be necessary in the event of the here supposed malfunction of the valve 158, the system 102 with respect to the temperature areas 107,108 and 109 can be operated in a substantially unchanged supply-controlled manner because the valve 178, as in normal operation wherein valves 188 and 252 are closed, provides for a relatively constant pressure in the air ducts 182, 244 and 248.

Should the malfunction of the valve 158 necessitate a pressure increase in the air duct 180, the pressure in the air ducts 182, 244 and 248 is to be reduced until it is lower than the pressure in the air duct 180. For this purpose, the valve 178 is accordingly controlled wherein the supply control of the valves 150 to 156, 228 to 234 and 236 to 242 is adjusted to the reduced pressure.

Should it be determined in the event of a pressure-controlled temperature control that a pressure increase in the corresponding air duct does not lead to a desired temperature increase for the affected temperature zone, is intended to cease further pressure increase via the valve employed for this purpose. Thus, pressures are avoided in the corresponding air duct, which do not provide in the desired manner for a temperature control in the affected temperature zone and which could lead to damages.

The invention claimed is:

1. A device for temperature control in an aircraft cabin including a first temperature area, the device comprising:
   a first supply control arrangement for controlling a supply of heated air from a first source of heated air into the first temperature area of the aircraft cabin, the first supply control arrangement including an air intake connected to the first source, an air outlet connected to the first temperature area, an air duct connected to the air intake and the air outlet, and a valve arrangement disposed at the air outlet, wherein the valve arrangement controls the supply of heated air into the first temperature area such that a specified first temperature for the first temperature area is achieved, and
   a first pressure control arrangement for controlling a pressure of heated air supplied from the first source into the first temperature area, the first pressure control arrangement controlling the pressure of heated air supplied into the first temperature area such that the specified first temperature for the first temperature area is achieved,
   wherein the first pressure control arrangement operates to control the pressure of heated air when the valve arrangement of the first supply control arrangement fails.

2. The device according to claim 1, wherein the aircraft cabin includes a second temperature area, and the valve arrangement of the first supply control arrangement controls the supply of heated air into the second temperature area such that a specified second temperature for the second temperature area is achieved, and
   wherein the first pressure control arrangement operates to control the pressure of heated air supplied into the second temperature area such that the specified second temperature for the second temperature area is achieved.

3. The device according to claim 2, wherein the air outlet comprises at least two air outlet ducts corresponding to respective temperature zones of the first and second temperature areas.

4. The device according to claim 3, wherein the valve arrangement comprises valves disposed in each of the air outlet ducts, the valves operative to control the supply of heated air in the air duct.

5. The device according to claim 1, further comprising:
   an operating status detecting arrangement connected to the first supply control arrangement for detecting a non-functional operating status of the valve arrangement.

6. The device according to claim 1, further comprising:
   a pressure detecting arrangement disposed in the air duct and configured to detect a current pressure in the air duct.

7. The device according to claim 1, wherein the supply control arrangement further comprises a shut-off arrangement operating to prevent airflow in an upstream direction from the first temperature area to the first pressure control arrangement.

8. A method for controlling temperature in an aircraft cabin including a first temperature area and an air duct, the method comprising:

controlling a supply of heated air from a first source of heated air through the air duct and into the first temperature area of the aircraft cabin with a valve arrangement controlled such that a specified first temperature for the first temperature area is achieved, and controlling a pressure of heated air supplied from the first source into the first temperature area with a pressure control arrangement controlled such that the specified first temperature for the first temperature area is achieved when the valve arrangement fails.

9. The method according to claim 8, wherein the aircraft cabin includes a second temperature area, and the method further comprises:

controlling a supply of heated air from the first source through the air duct and into the second temperature area of the aircraft cabin with the valve arrangement controlled such that a specified second temperature for the second temperature area is achieved, and controlling a pressure of heated air supplied from the first source into the second temperature area with a pressure control arrangement controlled such that the specified second temperature for the second temperature area is achieved when the valve arrangement fails.

10. The method according to claim 9, wherein the aircraft cabin includes a third temperature area, and the method further comprises:

controlling a supply of heated air from a second source of heated air through the air duct and into the third temperature area of the aircraft cabin with the valve arrangement controlled such that a specified third temperature for the third temperature area is achieved, and controlling a pressure of heated air supplied from the second source into the third temperature area with a pressure control arrangement controlled such that the specified third temperature for the third temperature area is achieved when the valve arrangement fails.

11. The method according to claim 10, wherein the aircraft cabin includes a fourth temperature area, and the method further comprises:

controlling a supply of heated air from the second source through the air duct and into the fourth temperature area of the aircraft cabin with the valve arrangement controlled such that a specified fourth temperature for the fourth temperature area is achieved, and controlling a pressure of heated air supplied from the second source into the fourth temperature area with a pressure control arrangement controlled such that the specified fourth temperature for the fourth temperature area is achieved when the valve arrangement fails.

12. The method according to claim 8, wherein the first temperature area further includes a plurality of temperature zones, and the air duct further includes a plurality of air outlet ducts configured to deliver the controlled supply of heated air into each of the plurality of temperature zones.

13. The method according to claim 8, further comprising: monitoring the valve arrangement to detect valve arrangement which fails.

14. The method according to claim 8, further comprising: detecting the pressure in the air duct.

15. The method according to claim 8, further comprising:
replacing the supply of heated air from the first source with a supply of heated air from a second source when the first source fails, and replacing the supply of heated air from the second source with the supply of air from the first source when the second source fails.

* * * * *